United States Patent [19]

Guzik et al.

[11] Patent Number: 5,382,887
[45] Date of Patent: Jan. 17, 1995

[54] METHOD AND APPARATUS FOR COMPENSATING POSITIONING ERROR IN MAGNETIC-HEAD AND MAGNETIC-DISK TESTER

[75] Inventors: Nahum Guzik, Palo Alto; Ufuk Karaaslan, Sunnyvale; Boris Slutsky, Los Altos, all of Calif.

[73] Assignee: Guzik Technical Enterprises, Inc., San Jose, Calif.

[21] Appl. No.: 36,975

[22] Filed: Mar. 25, 1993

[51] Int. Cl.6 .................................................. G11B 5/54
[52] U.S. Cl. .................................... 318/652; 73/865.9; 360/105; 369/53
[58] Field of Search ............... 318/560, 565, 592, 593, 318/626, 632, 652, 671, 685; 73/865.9; 209/567, 573, 655; 360/31, 75, 105, 106; 369/43, 53, 176, 215, 219, 223

[56] References Cited

U.S. PATENT DOCUMENTS 3,742,470  6/1973  Ha et al. .
4,702,101  10/1987  Abbe et al. .
4,836,916  6/1989  Kondo et al. .
4,850,695  7/1989  Mikuriya et al. .
4,902,971  2/1990  Guzik et al. .
5,032,932  7/1991  Kogure et al. .

Primary Examiner—Bentsu Ro
Attorney, Agent, or Firm—David Pressman

[57] ABSTRACT

A magnetic head and disk tester which has linear encoders (40 and 42) installed on lateral sides of a carriage (30) which carries a magnetic head (34), movable in a radial direction along a hard disk. Positions of the magnetic head with respect to the hard disk are measured by means of the linear encoders which are arranged on both lateral sides of the carriage. Outputs of the encoders are supplied to an arithmetic unit (45) which calculates the arithmetic mean of the encoder's outputs and transmits the resulting signal via a feedback line (47) to a piezoelectric translator (37). The translator is the final drive element in the carriage-drive system and is used for fine positioning of the carriage. Thus, if during positioning of the magnetic head the latter is installed in an erroneous position, e.g., because of yawing which may result from asymmetrical friction on both sides of the carriage, the feedback-positioning system composed of the encoders, the arithmetic unit, and the piezoelectric translator calculates the error and shifts the carriage in a direction opposite to the error to the correct position.

15 Claims, 4 Drawing Sheets

METHOD AND APPARATUS FOR COMPENSATING POSITIONING ERROR IN MAGNETIC-HEAD AND MAGNETIC-DISK TESTER

BACKGROUND

1. Field of the Invention

The present invention relates to magnetic-head and magnetic-disk testers, particularly to improved testers of read-write heads and magnetic disks and to a method for compensating positioning errors which occur during the operation of such testers.

2. Description of Prior Art

Prior to assembling computer disk drives, their main components, i.e., magnetic read-write heads and magnetic disks, are usually checked on magnetic-head and disk testers.

An example of a prior-art head and disk tester is shown in FIG. 1, a schematic perspective view of the tester. Such tester is described in earlier U.S. Patent application Ser. No. 840,527 filed Feb. 25, 1992 now U.S. Pat. No. 5,254,946, granted Oct. 19, 1993. The tester comprises two parallel bottom rails 10 and 12 which are rigidly attached to a tester housing 13, e.g., by bolts (not shown) and support and guide top rails 14 and 16, respectively. Top rails 14 and 16 are rigidly attached to an outer ring 18 which rotatingly supports an inner ring 20. The latter carries a magnetic-head holder 21 with a magnetic head 22. Thus, magnetic head 22 can move back and forth in the directions indicated by an arrow A and can be rotated by means of inner ring 20 around an axis B, which passes through head 22. A spindle 24 rotates around a fixed axis and supports and rotates a magnetic disk 26 to be tested.

For positioning the head at a predetermined location of disk 26 and at a predetermined angle to the disk's track (not shown), top rails 14 and 16 are guided over bottom rails 10 and 12 and shift magnetic head 22 radially with respect to magnetic disk 26. Inner ring 20 is then rotated, thus placing magnetic head 22 in the required position and at a predetermined angle to the track.

The testing requires that magnetic head 22 and disk 26 be accurately positioned in a predetermined relationship with respect to each other. Among parameters to be measured, an important one is track profile. Track profile is a characteristic which is obtained by measuring a read-back signal parameter, such as amplitude, pulse shape, etc., which depends on the transverse shift of the magnetic head with respect to the center line of the track.

Outer ring 18, together with top rails 14 and 16, form a carriage 28 which is shown in FIG. 1. Carriage 28 is moved along bottom rails 10 and 12 from a reversible stepper motor via a lead screw (not shown).

The system shown in FIG. 1 is an open-loop system, i.e., it does not employ feedback. Typically, the width of the track is about 10 $\mu$m or less. The open-loop system of this type produces a positioning uncertainty of about 1 $\mu$m. However, with the advent of a new generation of hard disks with tracks narrower than 10 $\mu$m, the uncertainty of 1 $\mu$m becomes unacceptable for measurement purposes.

One method of improving positioning accuracy is to employ a closed-loop system, measuring the displacement of head 22 and actively correcting any positioning error. It is, however, very difficult to measure the displacement of head 22 directly by means of a measurement instrument. This is because the space adjacent to the head is occupied by spindle 24, magnetic disk 26, and means for removably mounting head 22 on carriage 28. Therefore there is not enough room for locating the measurement instrument such as a linear encoder.

An attempt has been made to solve this problem by providing a tester with a closed-loop system which incorporates a measuring instrument located in a different place than the center of the carriage, e.g., on the side of the carriage. An example of such a device is an experimental disk/head tester which was constructed by Guzik Technical Enterprises of San Jose, California in July 1992. A schematic three-dimensional view of this tester is shown in FIG. 2.

The tester of FIG. 2 is essentially the same as the one of FIG. 1, with the exception that a linear encoder 11 is installed in close proximity to one side of carriage 28a, e.g., near bottom rail 12a. Encoder 11 consists of two parts: a stationary part or a reader head 11a which is attached, e.g., to housing 13a by screws 15 and 17, and a movable part, i.e., encoder scale 11b which is rigidly attached to carriage 28a, e.g., to top rail 16a by screws 19 and 23.

When during testing carriage 28a moves together with magnetic head 22a relatively to magnetic disk 26a, encoder 11 is used for determining the position of magnetic head 22a. Encoder 11 does not measure the position of magnetic head 22a: it is assumed that the displacement of a measurement point on the side of the carriage 28a, where the encoder is located, is approximately equal to that of the center of magnetic head. However, this is not true, if yawing occurs during the movement of the carriage.

More specifically, in the case of yawing, magnetic head 22a is displaced with respect to the measurement point by being rotated around this point with a radius equivalent to the distance from magnetic head 22a to the measurement point. With the radius of 10 cm and a yawing angle, which may be as high as 5 $\mu$radians, the displacement of magnetic head 22a with respect to the measurement point due to yawing, i.e., the position measurement error, may be as high as 0.5 $\mu$m.

Therefore, the closed loop compensation system (not shown) of the tester of FIG. 2, which uses an output signal of encoder 11 as a feedback signal to compensate for the head-position error, cannot achieve an accuracy better than 0.5 $\mu$m.

OBJECTS AND ADVANTAGES OF THE INVENTION

It is therefore an object of the invention to provide a tester for read-write heads and magnetic disks with improved head-positioning accuracy, with capacity for self-compensation of head-positioning error, and with a positioning accuracy better than 0.05 $\mu$m. Another object of the invention is to provide a method for compensating positioning errors which occur in such testers during their operation. Still another object is to provide a disk and head tester which ensures a track-profile measurement accuracy better than 0.05 $\mu$m (2 inch).

Other advantages and features of the invention will become apparent from a consideration of the ensuing description and drawings.

Figure 1:
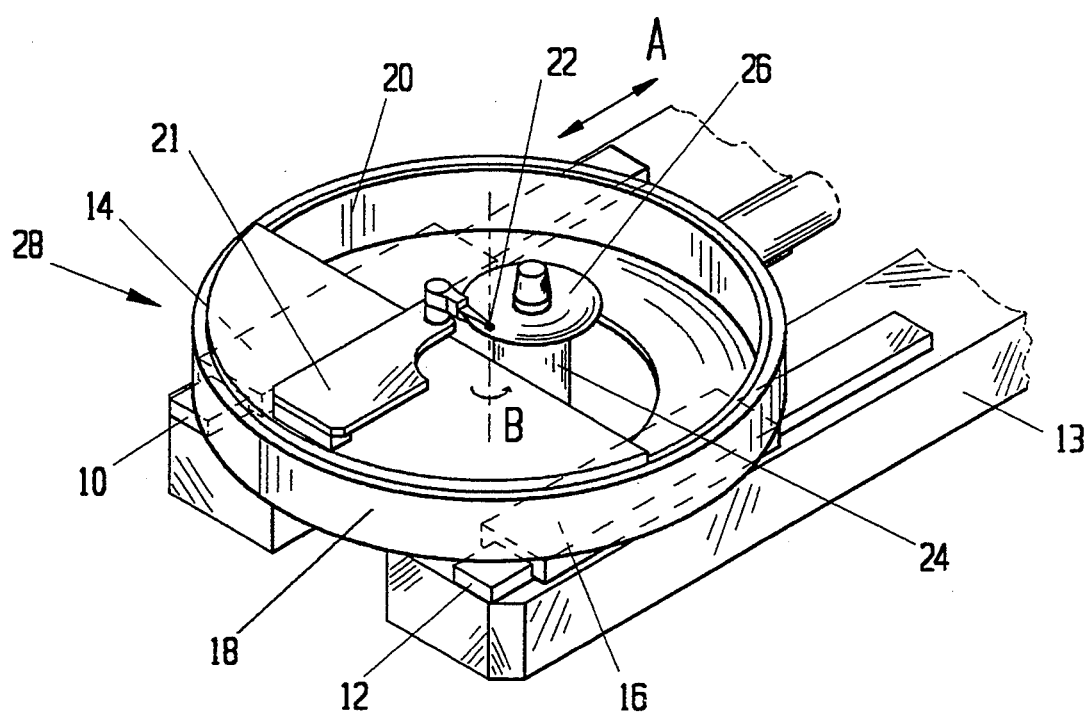
FIG. 1 is a schematic perspective view of a conventional prior-art magnetic head and disk tester without a positioning error compensating device.

REFERENCE NUMERALS USED IN THE DRAWINGS AND DESCRIPTION 10, 12—bottom rails
11—encoder
11a—stationary part of encoder
11b—movable part of encoder
13, 13a—tester housing
14, 16, 16a—top rails
18—outer ring
20—inner ring
21—magnetic-head holder
22, 22a, 34—magnetic heads
15, 17, 19, 23—screws
24—spindle
26, 26a—magnetic disks
28, 28a, 30—carriages
32—head holder
35—outer ring
36, 38—bottom rails
37—piezoelectric translator
39—stepper
40, 42—linear encoders
41—lead screw
40a, 42a—stationary parts of encoders
40b, 42b—moveable parts of encoders
43—housing
45—arithmetic unit
47—feedback line
49—controller-amplifier

SUMMARY

According to the present invention, a head and disk tester comprises a carriage, slidingly supported on a plurality of rails, and a pair of numerical-output linear encoders installed on both sides of the carriage in parallel to the direction of the carriage movement and symmetrically with respect to the center line of the carriage.

FIGS. 3 AND 4—DETAILED DESCRIPTION OF HEAD AND DISK TESTER

Figure 3:
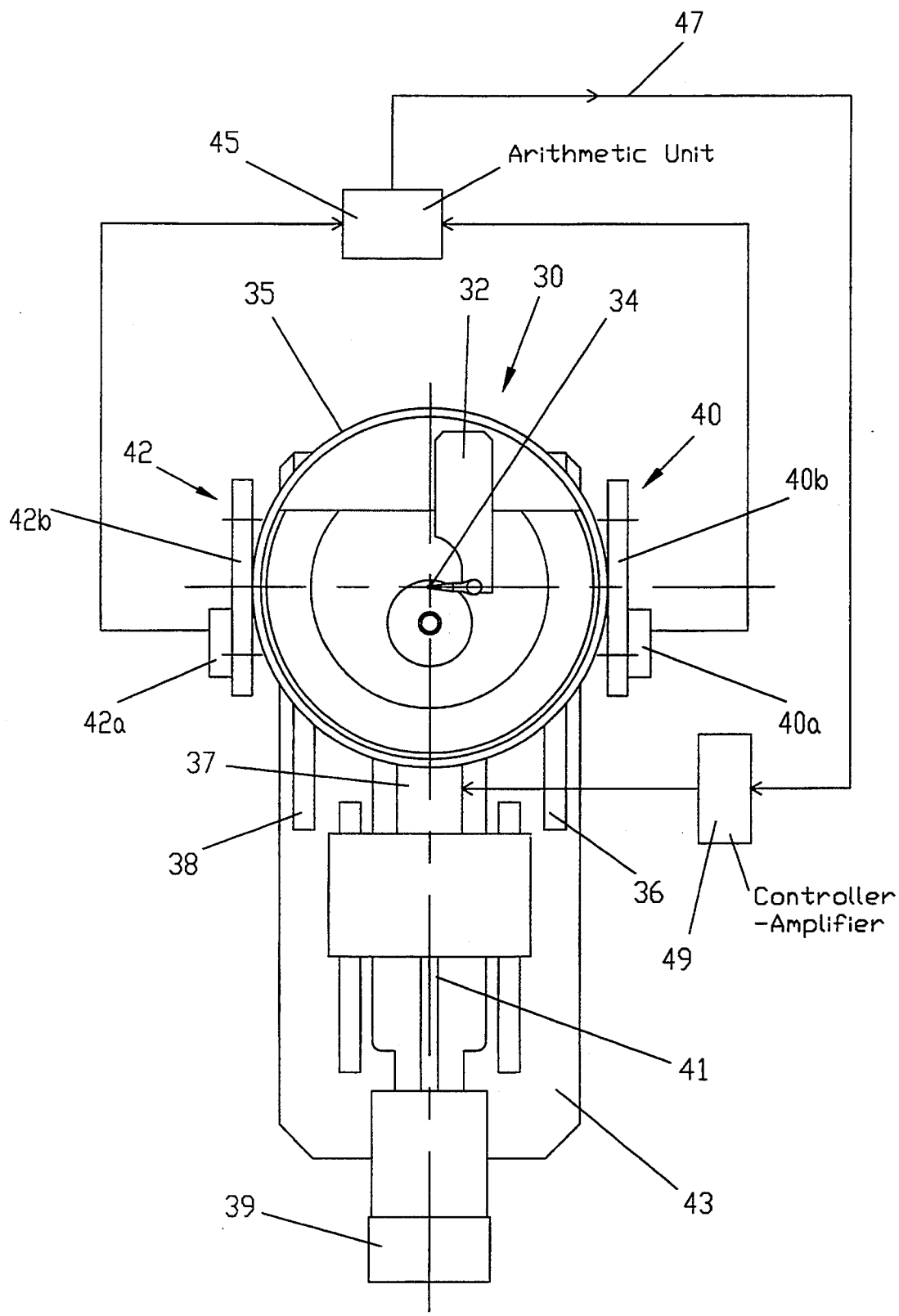
FIG. 3 is a schematic top view of a tester of the invention.

A schematic top view of a head and disk tester according to the invention is shown in FIG. 3.

Figure 2:
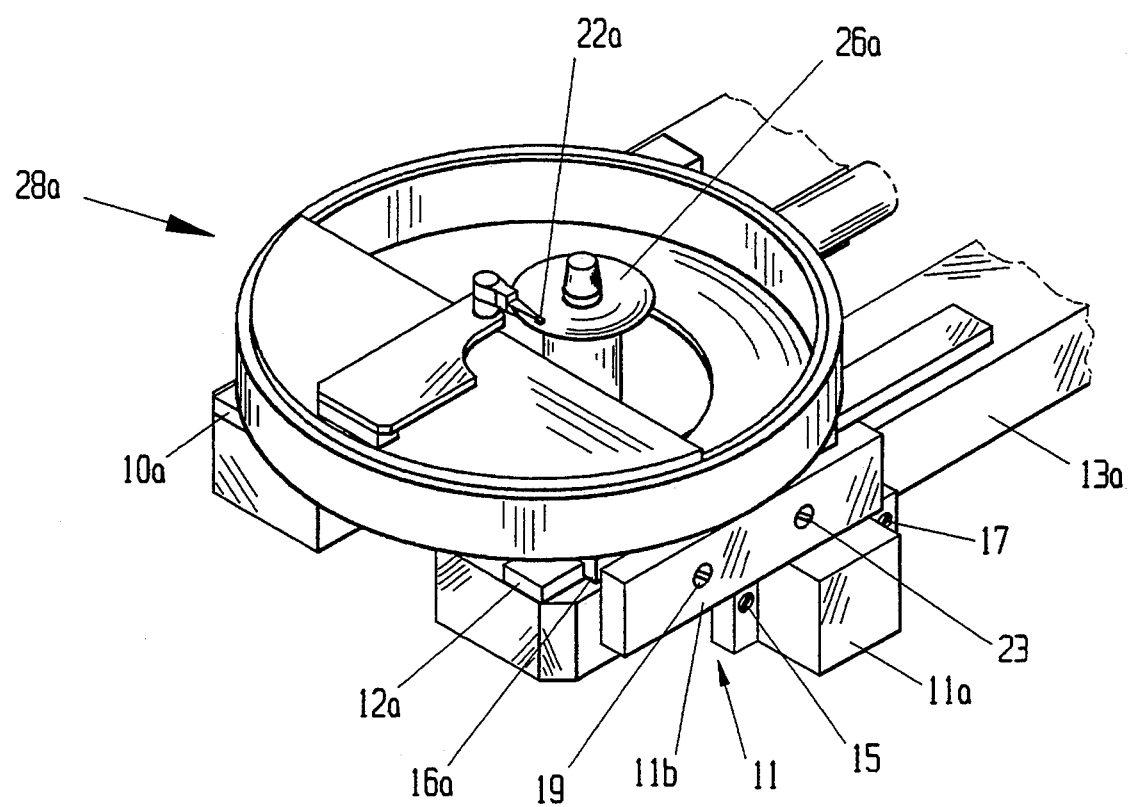
FIG. 2 is a schematic perspective view of a known prior-art magnetic head and disk tester with an encoder for measuring a head positioning error.

Similar to the tester of FIG. 2, the tester of FIG. 3 has a carriage 30 which slides along bottom rails 36 and 38 together with a head holder 32 and a magnetic head 34 to be tested. The carriage is driven from a stepper motor 39 through a lead screw 41 for coarse positioning of a magnetic head 34 and sequentially through a piezoelectric translator 37 for fine positioning.

Installed on both sides of carriage 30 in parallel to the direction of the carriage movement and symmetrically with respect to the center line of carriage 30 are two numerical-output linear encoders 40 and 42, e.g., model L-104 manufactured by Canon U.S.A. Inc. These encoders can measure displacements of the carriage with resolution of 0.01 μm.

As in the case of the tester of FIG. 2, each encoder consists of two parts, i.e., a stationary part, namely parts 40a and 42a (FIG. 3) which are attached to a housing 43, and a movable part, such as parts 40b and 42b, attached to outer ring 35.

Encoders 40 and 42 are installed on the sides of the carriage because they are more accessible in these positions and because it is difficult, inconvenient, and in some cases physically impossible to install a linear encoder at the point of interest, i.e., the read-write element of magnetic head 34. For covering the range of positions at which heads 34 may be tested, linear encoders are selected with the length of 75 to 100 mm.

Figure 4:
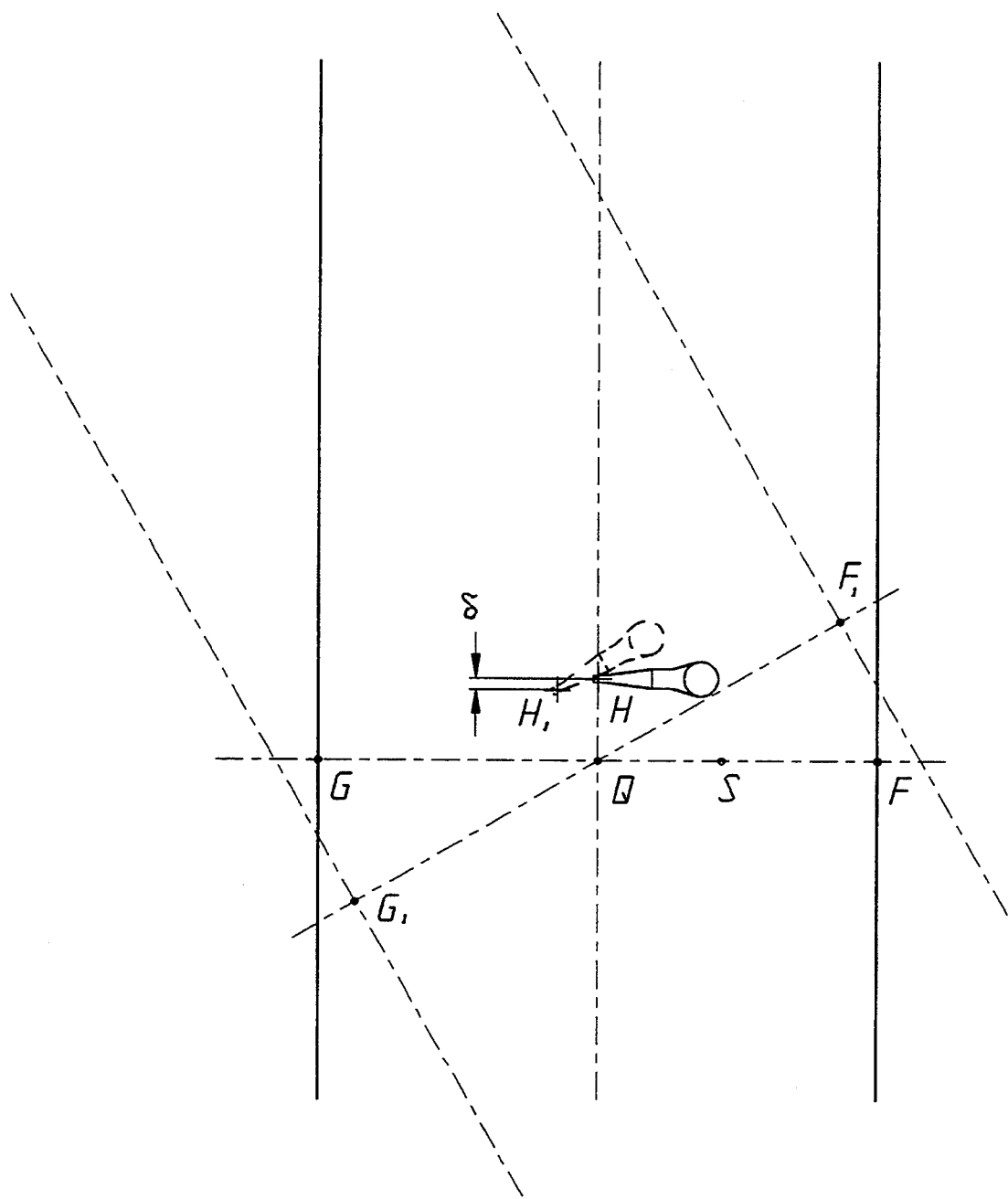
FIG. 4 is a schematic diagram showing the displacement of measuring points in the case of yawing.

As shown in FIG. 4, a position of any point S on a straight line connecting points of measurement F and G can be mathematically expressed through positions of two points F and G, e.g., as follows:

$$\text{Pos. } S = \frac{\text{pos. } F \,|GS| + \text{pos. } G \,|FS|}{|FG|}$$

where GS is a a distance from point G to point S, FS is a distance from point F to point S, and FG is a distance from point F to point G.

Thus, position of point S can be obtained with high accuracy without suffering the inconveniences associated with locating the measuring apparatus at point S. For example, the horizontal position of the geometrical center between points F and G can be expressed as an arithmetic mean of positions of points F and G.

As shown in FIG. 3, which is a schematic top view of the tester, outputs of both encoders 40 and 42 are connected to inputs of an arithmetic unit 45. This unit calculates an arithmetic mean of output signals of encoders 40 and 42 which represents a position of a geometrical center point Q. Magnetic head 34 is located close to point Q.

In FIG. 4 broken lines show the positions of the top rails and magnetic head 34 in the case of yawing. When yawing occurs, a center H of magnetic head 34 (which indicates the position of the read/write element of the head) will be rotated around point Q to a point $H_1$ with a radius QH, which is much smaller than radius QF, with which measurement point F will be rotated around point Q to a point $F_1$. In other words, since magnetic head 34 is physically located closely to point Q (within 0.1 mm), an error $\delta_1$ in the calculated displacement of point H will remain negligible (5 nm), even for yawing angles up to 50 μradians.

An output of arithmetic unit 45 is connected via a feedback line 47 and a controller-amplifier 49 to piezoelectric translator 37 which compensates the displacement of magnetic head 34.

Thus the measurement system forms a closed loop which operates with an accuracy better than 0.05 μ, e.g., 0.02 to 0.05 'm.

OPERATION

The magnetic-head and disk tester of FIG. 3 operates as follows:

First, magnetic head 34 is moved by means of stepper motor 39 via lead screw 41 with high speed to a position which is close to a point of interest on the disk (not shown in FIG. 3). Fine positioning of head 34 is then carried out by moving carriage 30 via piezoelectric translator 37. Encoders 40 and 42 provide outputs which are transmitted to arithmetic unit 45. Unit 45 then calculates the position of point Q in the carriage movement direction in terms of a signed arithmetic mean of the outputs of both encoders, as has been described above.

The results of the calculations are transmitted via feedback line 47 and controller-amplifier 49 to piezoelectric translator 37, resulting in a displacement of carriage 30 in the direction opposite to the erroneous displacement, i.e., in the direction to correct position of point Q. Since magnetic head 34 is physically close to point Q, i.e., at a distance of 0.1 mm, head 34 also will be located closely (about 5 nm or less) to the correct position.

As has been mentioned above, compensation through the closed loop system will provide final positioning of head 34 with an exceptional repetition accuracy, i.e., 0.02 to 0.05 $\mu$m.

SUMMARY, RAMIFICATIONS, SCOPE

Thus, it has been shown that we have provided a tester for read-write heads and magnetic disks with improved head positioning accuracy, with a capacity for self-compensation of head-positioning error with an accuracy of 0.02 to 0.05 $\mu$m. The invention also provides a method for compensating positioning errors which occur in such testers during their operation and makes it possible to manufacture a head-and-disk tester which ensures accuracy of track-profile measurement about 0.05 $\mu$m.

Although the head and disk tester has been shown and described in the form of one specific embodiment, this embodiment, its parts, materials, and configurations have been given only as examples, and many other modifications of the tester are possible. For example, the same method and measurement system are applicable to disk-testing operations rather than magnetic-head testing. Linear encoders may be realized in various forms, such as holographic scales, magnetic-strip readers, laser interferometers, etc. A piezoelectric translator may be replaced by another fine-positioning device capable of adjusting the position of the carriage with required resolution under the effect of a feedback command. Implementation of the controller can be based on digital signal processing, analog electronic circuitry, non-electronic means, or a combination of the above. Encoders may be located not necessarily at two symmetrical points on both sides of the carriage, but rather at any two different points of the carriage convenient for the installation. In this case, however, a different formula from that cited above will be used for calculating the amount of compensation.

Furthermore, the stationary components (reader heads) of the encoders can be attached to the carriage, thus becoming movable, while the movable components of the encoders can be made stationary by attaching them to the housing. This reversed arrangement allows the reader heads to be positioned such that the two reader heads and the read/write element of the magnetic head are permanently located along a line which is perpendicular to the line of travel of the magnetic head.

Therefore, the scope of the invention should be determined, not by the example given, but by the appended claims and their legal equivalents.

What we claim is:

1. A method for compensating magnetic-head-positioning error in a magnetic head and disk tester, said method comprising the steps of:
    providing a spindle unit which rotatingly supports a magnetic disk in a fixed position;
    providing a plurality of linear guides positioned on respective sides of said spindle unit;
    providing a carriage which is movable in said guides and which carries a magnetic head, said magnetic head having a read/write element;
    providing reversible drive means for driving said carriage in a line of travel, said reversible drive means being capable of imparting a displacement to said magnetic head with respect to said magnetic disk; and
    providing a measurement system for measuring a position of said magnetic head with respect to said magnetic disk, said system comprising:
        a first measurement member located at a first point of said carriage,
        a second measurement member located at a second point of said carriage,
        said first measurement member being capable of measuring a displacement of said first point and said second measurement member being capable of measuring a displacement of a second point, said displacement occurring in part under the effect of yawing of said carriage in said guides because of instability factors including asymmetrical friction;
        an arithmetic unit arranged to calculate a displacement of said magnetic head on the basis of outputs of said measurement members; and
        a feedback line connecting said arithmetic unit to said drive means, thereby to eliminate said magnetic-head-positioning error and to return said magnetic head to a correct position with respect to said magnetic disk;
    moving said magnetic head by means of said reversible drive means to a given position with respect to said magnetic disk;
    measuring displacements of said first point and said second point of said carriage from a reference point, said displacements occurring in part because of yawing of said carriage in the course of said movement;
    calculating, by means of said arithmetic unit, an erroneous linear displacement of said magnetic head on the basis of outputs of said measurement members;
    sending an output signal from said arithmetic unit to said drive means; and
    shifting said magnetic head to said correct position with respect to said magnetic disk by moving said carriage in a direction opposite to erroneous linear displacement.

2. The method of claim 1 wherein said step of moving said magnetic head to a given position with respect to said magnetic disk is performed by a stepper motor used for coarse positioning of said magnetic head and by a piezoelectric translator arranged in series with said stepper motor and intended for fine positioning of said magnetic head.

3. The method of claim 2 wherein said step of measuring displacements of said first point and said second point of said carriage from a reference point is performed for said first point and said second point which are located on both sides of said carriage and lie in a plane which passes through said read/write element of said magnetic head, said plane being parallel to said line of travel, said first and second points being equidistant from said read/write element of said magnetic head, so that said displacement of said magnetic head is a signed arithmetic mean of said displacements of said points.

4. The method of claim 3 wherein said step of calculating an erroneous linear displacement of said magnetic head is performed on the basis of outputs of a plurality of linear encoders.

5. The method of claim 4 wherein said linear encoders have measurement repetition accuracy not worse than 0.01 $\mu$m.

6. The method of claim 5 wherein said measurement system is provided with a controller-amplifier in said feedback line.

7. A magnetic head and disk tester which compensates for magnetic-head-positioning error, said tester comprising:
   a spindle unit which rotatingly supports a magnetic disk in a fixed position;
   a plurality of linear guides positioned on respective sides of said spindle unit;
   a carriage which is movable in said guides and which carries a magnetic head, said magnetic head having a read/write element;
   drive means for driving said carriage in a line of travel, said drive means being capable of imparting a displacement to said magnetic head with respect to said magnetic disk; and
   a measurement system for measuring a position of said magnetic head with respect to said magnetic disk, said system comprising:
      a first measurement member located at a first point of said carriage;
      a second measurement member located at a second point of said carriage, said first measurement member being capable of measuring a displacement of said first point and said second measurement member being capable of measuring a displacement of said second point, said displacement occurring in part under the effect of yawing of said carriage in said guides because of instability factors including asymmetrical friction;
      an arithmetic unit arranged to calculate a displacement of said head on the basis of outputs of said measurement members; and
      a feedback line from said arithmetic unit to said drive means, thereby to eliminate said magnetic-head-positioning error and to return said magnetic head to a correct position with respect to said magnetic disk.

8. The tester of claim 7 wherein said drive means is reversible and consists of a first drive means for coarse positioning of said magnetic head and a second drive means arranged in series with said first drive means and intended for fine positioning of said magnetic head.

9. The tester of claim 8 wherein said first point is located on one side of said carriage and said second point is located on a second side of said carriage which is opposite to said first side, both of said points being located in a plane which passes through the read/write element of said magnetic head and which is parallel to said line of travel, said first and second points being equidistant from said read/write element, so that said displacement of said magnetic head is a signed arithmetic mean of said displacements of said first and second points.

10. The tester of claim 9 wherein said measurement members are linear encoders, said first drive means is a stepper motor and said second drive means is a piezoelectric translator.

11. The tester of claim 10 wherein said linear encoders have repetition accuracy not worse than 0.01 $\mu$m.

12. The tester of claim 11 wherein said feedback line contains a controller-amplifier.

13. A magnetic head and disk tester which compensates for magnetic-head-positioning error, said tester comprising:
   a spindle unit which rotatingly supports a magnetic disk in a fixed position;
   linear guides arranged on both sides of said spindle unit and at equal distances therefrom;
   a carriage which is movable in said guides and which carries a magnetic head, said magnetic head having a read/write element, said carriage having first and second lateral sides;
   a stepper motor for coarse positioning of said magnetic head, a lead screw between said stepper motor and said carriage, and a piezoelectric translator for fine positioning of said magnetic head, said piezoelectric translator being located between said lead screw and said carriage, said stepper motor and said piezoelectric translator being capable of imparting a displacement to said magnetic head in a radial direction with respect to said magnetic disk; and
   a measurement system for measuring a position of said magnetic head with respect to said magnetic disk, said system comprising:
      a first linear encoder located on said first lateral side of said carriage;
      a second linear encoder located on said second lateral side of said carriage;
      said first linear encoder being capable of measuring a first linear displacement of a first point on said first lateral side and said second linear encoder being capable of measuring a second linear displacement of a second point on said second lateral side, said first and second linear displacements being parallel to said radial direction, said first and second linear displacements occurring in part under the effect of yawing of said carriage in said guides because of instability factors including asymmetrical friction;
      an arithmetic unit calculating said displacement of said head on the basis of outputs of said first and second linear encoders; and
      a feedback line which contains a controller-amplifier and which connects said arithmetic unit to said stepper motor and said piezoelectric translator through said controller-amplifier, thereby to eliminate said magnetic-head-positioning error and to return said magnetic head to a correct position with respect to said magnetic disk.

14. The tester of claim 13 wherein said first point and said second point are located in a plane which passes through said read/write element of said magnetic head and which is parallel to said radial direction, so that said displacement of said magnetic head is a signed arithmetic mean of said first and second linear displacements of said first and second points, said points being equidistant from said read/write element of said magnetic head.

15. The tester of claim 14 wherein said linear encoders have a repeatability not worse than 0.01 $\mu$m.

* * * * *

UNITED STATES PATENT AND TRADEMARK OFFICE
CERTIFICATE OF CORRECTION

PATENT NO.: 5,382,887
DATED: Jan. 17, 1995
PATENTEE(S): N. Guzik et al.

It is certified that error appears in the above-identified patent and that said Letters Patent is hereby corrected as shown below:

Col.2, line 27, change "relatively" to —relative—.
Col. 2, l. 65, change "(2 inch)" to —(2 μinch)—
Col. 4, l. 59, change "0.05 'm." to —0.05 μm—

Signed and Sealed this

Twenty-eight Day of March, 1995

BRUCE LEHMAN

*Attest:*

*Attesting Officer*  *Commissioner of Patents and Trademarks*